United States Patent [19]
Suffredini et al.

[11] 4,100,445
[45] Jul. 11, 1978

[54] IMAGE OUTPUT SCREEN COMPRISING JUXTAPOSED DOPED ALKALI-HALIDE CRYSTALLINE RODS

[75] Inventors: Joseph R. Suffredini, Darien, Conn.; Robert A. Hagar, Saratoga, Calif.

[73] Assignee: The Machlett Laboratories, Inc., Stamford, Conn.

[21] Appl. No.: 666,843

[22] Filed: Mar. 15, 1976

[51] Int. Cl.² .............................................. H01J 39/18
[52] U.S. Cl. ..................................... 313/101; 313/102
[58] Field of Search .................................. 313/94, 101

[56] References Cited
U.S. PATENT DOCUMENTS

| | | | |
|---|---|---|---|
| 2,739,243 | 3/1956 | Sheldon | 313/101 X |
| 3,304,455 | 2/1967 | Mesta | 313/94 |
| 3,553,518 | 1/1971 | Schagen | 313/94 |
| 3,693,018 | 9/1972 | Spicer | 313/102 |
| 3,863,093 | 1/1975 | Orthuber | 313/101 |
| 3,892,971 | 7/1975 | Arthur et al. | 250/361 |
| 3,944,832 | 3/1976 | Kalish | 250/361 |

Primary Examiner—Robert Segal
Attorney, Agent, or Firm—John T. Meaney; Joseph D. Pannone; Harold A. Murphy

[57] ABSTRACT

An image intensifier tube having an output imaging screen comprising a scintillator layer of juxtaposed crystalline rods made of doped alkali-halide material, such as cesium iodide doped with sodium or thallium, for example.

2 Claims, 4 Drawing Figures

IMAGE OUTPUT SCREEN COMPRISING JUXTAPOSED DOPED ALKALI-HALIDE CRYSTALLINE RODS

BACKGROUND OF THE INVENTION

1. Field of the Invention

This invention relates generally to light amplifier tubes and is concerned more particularly with an image intensifier tube having a highly efficient output screen.

2. Discussion of the Prior Art

Generally an image intensifier tube comprises a tubular envelope having a photocathode disposed adjacent a radiation transmissive faceplate at an input end of the envelope, and an imaging screen supported adjacent a light transmissive faceplate at the output end of the envelope. The photocathode usually includes a layer of photoemissive material disposed to receive a radiational image of an external object and to emit an equivalent electron image in the direction of the imaging screen. In operation, the imaging screen generally is maintained at a relatively high positive potential with respect to the photocathode for establishing an electron accelerating field therebetween. As a result, the electron image emitted from the photocatode is electrostatically focused onto the imaging screen with sufficient kinetic energy to produce a corresponding visual image which may be viewed through the output faceplate of the tube.

The imaging screen generally comprises a layer of phosphor powder material, such as silver activated zinc cadmium sulfide, for example, which may be deposited on a transparent substrate by conventional means, such as settling or centrifuging, for examples. The phosphor powder layer fluoresces locally in accordance with the spatial distribution of energy in the electron image, thereby producing a corresponding visual image. However, it has been found that due to the particulate nature of the deposited powder material numerous voids are developed throughout the imaging screen layer. The voids do not contribute to production of the visual image, and cause scattering of the visible light produced by the adjacent phosphor material. As a result, the deposited layer of phosphor powder material produces a visual image having low contrast characteristics and is very inefficient in converting incident electron energy into visible photon energy.

Therefore, it is advantageous and desirable to provide an image intensifier tube with an output imaging screen made of high packing density material for producing a visual image having improved contrast characteristics, and efficient conversion of incident electron energy into photons of visible light.

SUMMARY OF THE INVENTION

Accordingly, this invention provides an image intensifier tube comprising an evacuated envelope having therein a photocathode disposed adjacent an input faceplate, and an aligned imaging screen including a scintillator layer of doped alkali-halide material supported adjacent an output faceplate of the tube. Alkali-halide compounds have cubic crystalline cells forming stable lattice structures which are not conducive to the emission of photons when penetrated by high energy electrons. However, an alkali-halide material may be doped with a suitable element for combining with the halide component to form a compound having similar cubic crystalline cells of different size as compared to the cells of the parent alkali-halide material. As a result, the doped alkali-halide material becomes highly conducive to the emission of photons in response to high energy, penetrating electrons. Consequently, the layer of doped alkali-halide material is an excellent scintillator for use in the output screen of an image intensifier tube.

Thus, the alkali component of the scintillator layer comprises a member of the group including lithium, sodium, potassium, rubidium, and cesium. Also, the halide component of the layer comprises a member of the halogen group including fluorine, chlorine, bromine, and iodine. The dopant material may be of the group including sodium, copper, silver, gold, mercury, and thallium, for examples. A preferred imaging screen material comprises cesium iodide doped with sodium or thallium, for examples. The thallium doped cesium iodide material has a spectral emission distribution centered in the green region of the visible spectrum, which is suitable for ocular viewing of the output image, for example. The sodium doped cesium iodide material has a spectral emission distribution centered in the blue region of the visible spectrum, which is suitable for film recording or TV viewing, for examples.

The doped alkali-halide material may be deposited on a substrate by suitable means, such as evaporation, for example. The substrate is maintained at a substantially lower temperature than the deposited material in order to inhibit lateral migration thereof and enhancing longitudinal growth of the doped alkali-halide crystals. Accordingly, the deposited scintillator layer comprises a plurality of juxtaposed microcrystalline rods disposed in side-by-side relationship and substantially perpendicular to the supporting substrate. As a result, the juxtaposed rods function as respective light pipes which enhance the longitudinal transmission of the light generated therein, and inhibit lateral diffusion of the light. Since the layer of juxtaposed rods provides a high packing density, approaching 100%, for example, the layer is substantially free of voids, and, consequently, is much more efficient as a scintillator for output imaging screens than the conventional phosphor powder scintillators.

BRIEF DESCRIPTION OF THE DRAWING

For a better understanding of this invention reference is made in the following more detailed description to the accompanying drawing wherein.

DESCRIPTION OF THE PREFERRED EMBODIMENT

Figure 1:
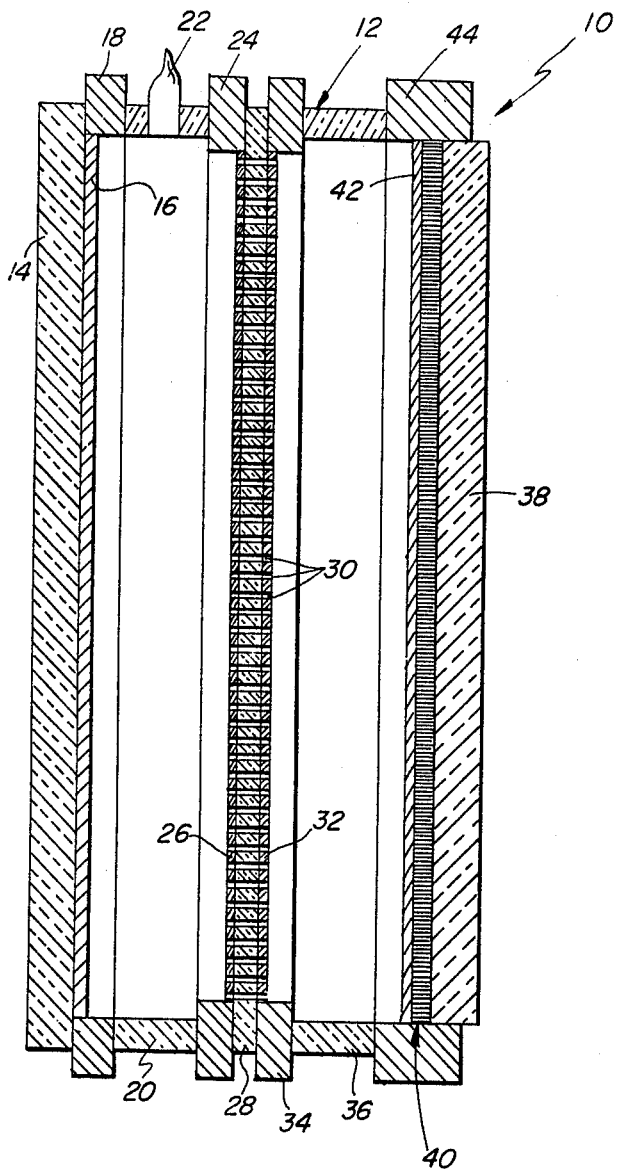
FIG. 1 is an axial sectional view of a proximity focusing, image intensifier tube embodying the invention.

Referring to the drawing wherein like characters of reference designate like parts, there is shown in FIG. 1 an image intensifier tube 10 of the proximity focusing type having a tubular envelope 12. Envelope 12 is closed at one end by an input faceplate 14 made of radiation transmissive material, such as glass, for example, and having supported on the inner surface thereof a photocathode 16. The photocathode 16 generally includes a coaxial layer of photoemissive material, such as sodium potassium cesium antimonide, for example, which receives an incident image transmitted through the faceplate 14 and emits an equivalent electron image. Hermetically attached to a peripheral portion of the photocathode 16 is an annular terminal disc 18 which provides means for maintaining the photocathode at a desired electrical potential. Terminal disc 18 is hermetically attached at one end of a dielectric ring 20, which may have hermetically sealed in the cylindrical wall thereof an exhaust tubulation 22. The exhaust tubulation 22 provides means for evacuating envelope 12 and generally is sealed off, in a conventional manner, when processing of the tube is completed.

The other end of dielectric ring 20 is hermetically attached to a second annular terminal ring 24 which, in turn, is sealed to a peripheral portion of a conductive coating 26 on an adjacent flat surface of a coaxial, microchannel plate 28. Terminal ring 24 provides means for maintaining the conductive coating 26 at a positive potential with respect to the photocathode 16 for establishing an electron accelerating field therebetween. As a result, the electron image emitted from the photocathode 16 is electrostatically accelerated toward the adjacent surface of microchannel plate 28 with sufficient velocity to minimize lateral spreading of the image.

Extending axially through the microchannel plate 28 is a plurality of closely spaced holes 30 having respective cylindrical walls which emit pluralities of secondary electrons when struck by primary electrons. Accordingly, electrons in the image emitted from the photocathode 16 enter aligned holes 30 in the microchannel plate 28 and strike the walls thereof, thus producing respective pluralities of secondary electrons. Consequently, as compared to the electron image entering the holes 30, the electron density of the corresponding electron image emerging therefrom is greatly increased. The holes 30 have respective exit apertures disposed in the opposing flat surface of plate 28 which surface is provided with a conductive coating 32. A peripheral portion of the coating 32 is sealed to a third annular terminal disc 34 which is hermetically attached to one end of a dielectric ring 36. The third terminal ring 34 provides means for maintaining the adjacent surface of microchannel plate 28 at a higher positive potential than the opposing surface thereof in order to accelerate the electron amplified image out of the holes 30 and toward the opposing end of envelope 12.

The opposing end of envelope 12 is closed by an output faceplate 38 having an inner surface supporting an imaging screen 40 which is provided with a conductive coating 42. A peripheral portion of the conductive coating 42 is sealed to a fourth annular terminal disc 44 which is hermetically attached to the other end of a dielectric ring 36. The fourth terminal disc 44 provides means for maintaining the conductive coating 42 at a higher positive potential than the adjacent surface coating 32 of the microchannel plate 28. As a result, the electron amplified image emerging from the holes 30 is accelerated toward the imaging screen 40 at a sufficiently high velocity to minimize lateral spreading of the image and to permit passage of electrons in the image through the conductive coating 42. The accelerated electrons in the image, thus electrostatically amplified, penetrate aligned regions of the imaging screen 40 with sufficient energy to generate associated photons of visible light and thereby produce an amplified visual image. Accordingly, the conductive coating 40 preferably is made of a light reflective material, such as aluminum, for example, for shielding the photocathode 16 and directing the visible light image toward the output faceplate 38. Also, the output faceplate generally is made of light transmissive material, such as glass, for example, which permits external viewing of the visible light image produced by the imaging screen 40.

Figure 2:
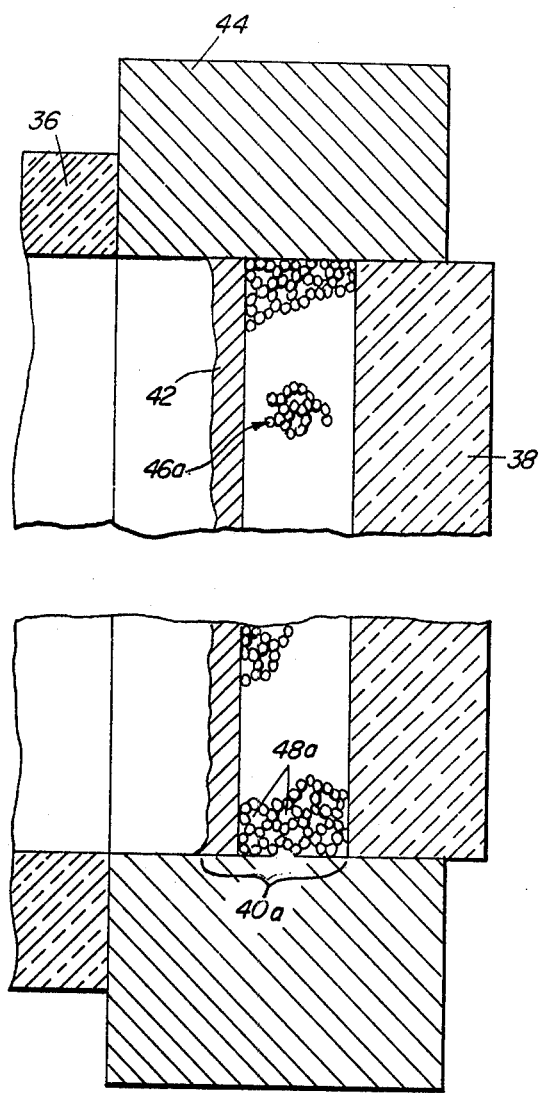
FIG. 2 is an enlarged fragmentary axial view of a prior art imaging screen.

As shown in FIG. 2, a conventional image intensifier tube of the described type generally is provided with an imaging screen 40a comprising a deposited layer 46a of phosphor powder material, such as zinc cadmium sulfide, for example. The layer 46a generally is deposited on the substrate faceplate 38 by conventional means, such as settling or centrifuging, for examples. Due to the particulate nature of the phosphor powder material, numerous voids, such as 48a, for examples, are developed throughout the layer 46a. The voids 48a do not contribute to the production of visible light photons thereby decreasing the potential efficienty of the layer 46a in forming the visible output image. Furthermore, in the transmission of the visible light image toward the output faceplate 38, the voids 48a tend to scatter the light, thus reducing contrast in the output image, as viewed through the adjacent faceplate 38.

Figure 3:
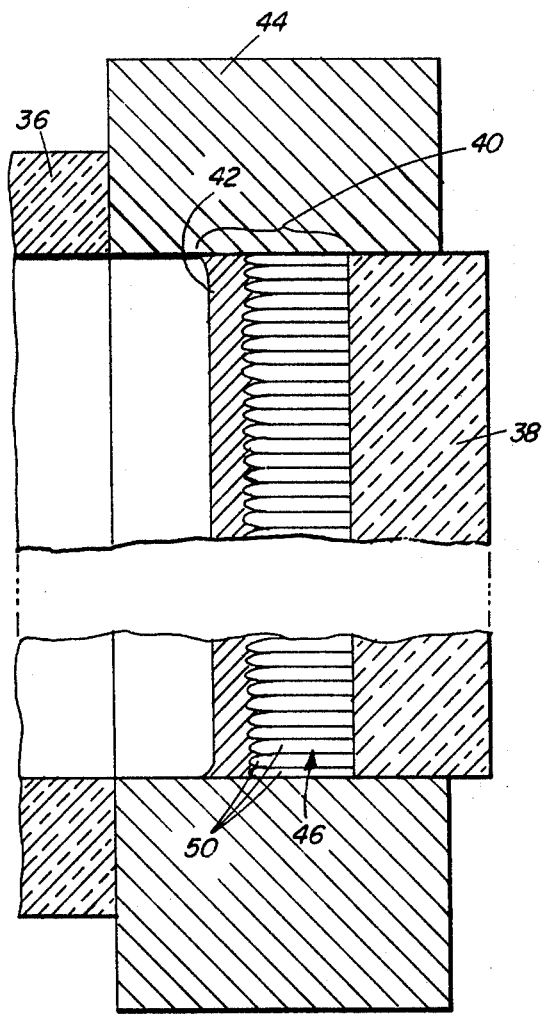
FIG. 3 is an enlarged fragmentary axial view of the output imaging screen shown in FIG. 1.

On the other hand, the output imaging screen 40 of this invention, as shown more clearly in FIg. 3, comprises a layer 46 of juxtaposed microcrystalline rods 50 of suitably doped alkali-halide material, which intrinsically is a more efficient scintillator than phosphor powder materials. Each of the crystalline rods 50 is disposed longitudinally with respect to the supporting substrate faceplate 38 and functions as a respective light pipe for transmission of visible light generated therein toward the output faceplate 38. Thus, the juxtaposed crystalline rods 50 inhibit transverse diffusion of the visible light, and provide longitudinal transmission thereof to enhance contrast in the visible light image, as viewed through the output faceplate 38.

The alkali component of layer 46 may comprise one or more members of the group including lithium, sodium, potassium, rubidium, and cesium. The halide component of layer 46 comprises a member of the halogen group including fluorine, chlorine, bromine and iodine. The dopant material may comprise a member of the group including sodium, copper, silver, gold, mercury, and thallium, for examples. A preferred imaging screen material, in accordance with this invention, comprises cesium iodide doped with sodium or thallium, for examples. The thallium doped cesium iodide material has a spectral emission distribution centered in the green region of the visible spectrum, which is suitable for ocular viewing, for example, of the output image through the output faceplate 38. The sodium doped cesium iodide material has a spectral emission distribution centered in the blue region of the visible spectrum, which is suitable for film recording or TV viewing, for examples, of the output image.

The scintillator layer 46 may be deposited by suitable means, such as evaporation, for example, whereby the relatively cooler substrate faceplate 38 inhibits lateral migration of the deposited alkali-halide material. Also, the inner surface of the output faceplate 38 may be frosted, as by sand-blasting, for example, to provide light diffusive properties and producing nucleation sites for the microcrystalline rods 50 to grow longitudinally away from the supporting substrate faceplate 38. Thus, the alkali-halide material is deposited in the form of microcrystalline rods 50 which grow in side-by-side relationship and substantially longitudinally with respect to the faceplate 38. As a result, the microcrystalline rods 50 are tightly packed to a density greater than 70 percent and even may approach 100 percent of the theoretical maximum value, for example. In comparison, a phosphor powder, such as zinc cadmium sulfide, for example, cannot be settled with a packing density greater than about seventy percent, and generally has a packing fraction of only about 35 to 40 percent.

Accordingly, the layer 46 of the tightly packed crystallites 50, as compared to an equal thickness layer 46a of phosphor powder material, is much more efficient in converting electron energy into visible photon energy. Thus, a thinner layer 46, such as three microns, for example, of alkali-halide material is sufficient for producing a visible light image equivalent to the image obtained from a relatively thicker layer 46a, such as 8 to 9 microns, for example, of phosphor powder material. Consequently, the thinner layer 46 of alkali-halide material may be used to enhance resolution in the image from a purely geometrical consideration, since the visible light image generated in the thinner layer 46 is closer to the output faceplate than the image generated in the thicker layer 46a. Thus, in comparison to the relatively low resolution and contrast provided by conventional phosphor powder imaging screens, the output imaging screen of this invention provides improved resolution and contrast characteristics which enhance overall gain and performance of an image intensifier tube.

Figure 4:
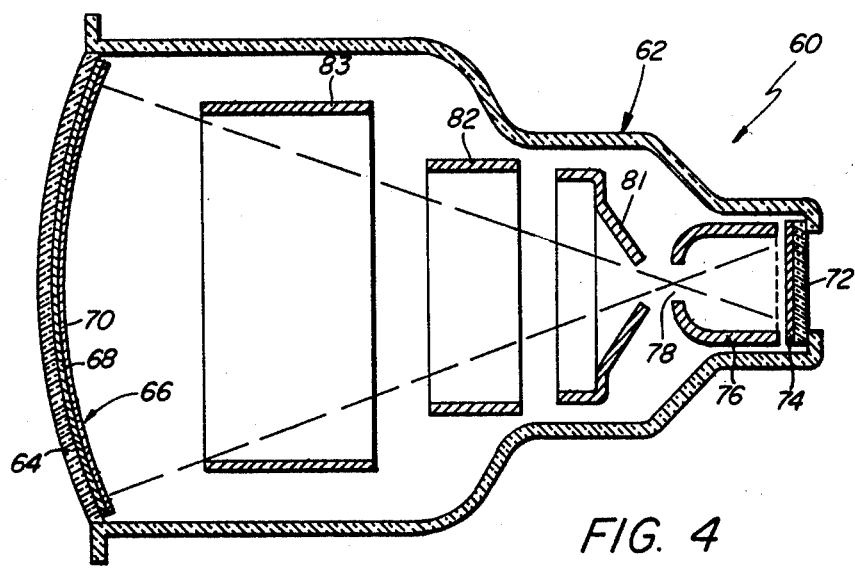
FIG. 4 is an axial sectional view of an inverted focusing, image intensifier tube embodying the invention.

In FIG. 4, there is shown an alternative embodiment comprising an image intensifier tube 60 of the inverted focusing type. Tube 60 includes a tubular envelope 62 comprising a dielectric housing having a large diameter end and an opposing smaller diameter end. The large diameter end of envelope 62 is closed by an input faceplate 4 made of X-ray transmissive material, such as aluminum, for example. Supported on the inner surface of faceplate 64 is an input screen 66 comprising a layer 68 of fluorescent material sensitive to X-radiation and an overlying photocathode 70. The fluorescent layer 68 of input screen 66 may be made of cesium iodide material, for example, which is highly sensitive to the characteristic X-rays emitted by common diagnostic tracer materials, such as iodine or barium, for examples. The photocathode 70 comprises a layer of photoemissive material, such as cesium antimonide, for example.

Thus, in operation, an X-ray image passes through the input faceplate 64 and impinges on the adjacent layer 68 of input screen 66. As a result, the layer 68 fluoresces locally in accordance with the spatial distribution of energy in the incident X-ray image, thereby producing a corresponding faint visible light image. This light image impinges on the adjacent photocathode 70 and causes it to emit an equivalent electron image in the direction of the smaller diameter, opposing end of envelope 62.

The opposing end of envelope 62 is closed by an output faceplate 72 made of light transmissive material, such as glass, for example. Supported on the inner surface of faceplate 72 is an imaging screen 74 which, in accordance with this invention, comprises a scintillator layer of suitably doped alkali-halide material, such as cesium iodide doped with thallium, for example. An anode sleeve 76 has a large open end disposed adjacent the imaging screen 74 and an opposing inwardly tapered end defining an aperture 78. Disposed longitudinally between the anode sleeve and the photocathode 70 is a coaxially aligned series of spaced grid electrodes 81-83, respectively.

In operation, the grid electrodes 81-83 are maintained at suitable electrical potentials for electrostatically focusing the electron image emitted by photocathode 70 toward a cross-over region adjacent the aperture 78 of the anode sleeve 76. As a result, the electron image is inverted and enlarges accordingly as it passes longitudinally through the anode sleeve 76. Consequently, the enlarged inverted image impinges on the juxtaposed microcrystalline rods of imaging screen 74 with sufficient energy to cause the doped alkali-halide material of the rods to fluoresce locally. Thus, the imaging screen 74 produces a bright corresponding visual image which is transmitted longitudinally along the juxtaposed rods of doped alkali-halide with substantially no lateral diffusion of the light. Accordingly, the bright visual image reaching the output faceplate 72 retains the resolution and contrast characteristics desirable for direct viewing of the image by an observer.

Thus, there has been disclosed herein an output imaging screen suitable for various types of image intensifier tubes, such as proximity focusing types and inverted focusing types, for examples. The imaging screen of this invention comprises a plurality of juxtaposed microcrystalline rods made of doped alkali-halide material and extending longitudinally from a substrate in tightly packed, side by side relationship. As a result, each of the rods functions as a respective light pipe for enhancing longitudinal transmission of light generated therein and for inhibiting lateral diffusion thereof.

From the foregoing, it will be apparent that all of the objectives of this invention have been achieved by the structures shown and described. It also will be apparent, however, that various changes may be made by those skilled in the art without departing from the spirit of the invention as expressed in the appended claims. It is to be understood, therefore, that all matter shown and described is to be interpreted as illustrative rather than in a restrictive sense.

What is claimed is:

1. An image intensifier tube comprising:
   an envelope having spaced input and output faceplates; an input screen means disposed within the envelope and adjacent the input faceplate for receiving an incident radiational image and emitting an equivalent electron image; and
   an output imaging screen means aligned with said input screen means and disposed adjacent the output faceplate for receiving the electron image and producing a corresponding visible light image, the imaging screen means including a layer of juxtaposed crystalline rods disposed axially with respect to the output faceplate in tightly packed side-by-side relationship to a packing density greater than seventy percent of the theoretical maximum value, said crystalline rods being doped alkali-halide material.

2. An image intensifier tube as set forth in claim 1 wherein the surface of the output faceplate adjacent the imaging screen means is a light diffusive surface and the layer of juxtaposed crystalline rods is supported thereon.